(12) United States Patent
Rothenberg et al.

(10) Patent No.: US 8,492,673 B2
(45) Date of Patent: Jul. 23, 2013

(54) REDUCING A GENERATION OF CONTAMINANTS DURING A SOLDER REFLOW PROCESS

(75) Inventors: Edgar Rothenberg, San Jose, CA (US); Jr-Yi Shen, Santa Clara, CA (US)

(73) Assignee: HGST Netherlands B.V., Amsterdam (NL)

( * ) Notice: Subject to any disclaimer, the term of this patent is extended or adjusted under 35 U.S.C. 154(b) by 1246 days.

(21) Appl. No.: 12/342,654

(22) Filed: Dec. 23, 2008

(65) Prior Publication Data
US 2010/0155457 A1    Jun. 24, 2010

(51) Int. Cl.
B23K 31/02    (2006.01)
B32B 15/08    (2006.01)

(52) U.S. Cl.
USPC ............ 219/85.13; 360/245.9; 360/244.3; 228/179.1; 228/180.1; 228/180.21; 228/180.22

(58) Field of Classification Search
USPC ............ 219/12, 85, 85.13, 121.6, 121.85; 228/179.1–180.22
See application file for complete search history.

(56) References Cited

U.S. PATENT DOCUMENTS

| | | | |
|---|---|---|---|
| 5,345,161 A * | 9/1994 | Zieve | 320/166 |
| 5,748,409 A | 5/1998 | Girard et al. | |
| 5,761,058 A * | 6/1998 | Kanda et al. | 363/60 |
| 5,831,788 A * | 11/1998 | Hofland | 360/99.19 |
| 5,838,519 A * | 11/1998 | Takizawa et al. | 360/245.9 |
| 6,040,560 A * | 3/2000 | Fleischhauer et al. | 219/494 |
| 6,394,819 B1 * | 5/2002 | Mosser et al. | 439/83 |
| 6,396,665 B1 * | 5/2002 | Asano | 360/264.2 |
| 6,426,282 B1 * | 7/2002 | Saigal et al. | 438/613 |
| 6,483,669 B1 * | 11/2002 | Krinke | 360/244.1 |
| 6,576,148 B1 * | 6/2003 | Shum et al. | 216/13 |
| 6,717,059 B2 * | 4/2004 | Shintani et al. | 174/251 |
| 6,944,936 B2 * | 9/2005 | Krinke | 29/603.04 |
| 6,965,499 B1 | 11/2005 | Zhang et al. | |
| 6,992,864 B2 | 1/2006 | Kaneko et al. | |
| 7,167,776 B2 * | 1/2007 | Maharajh et al. | 700/266 |
| 7,168,154 B2 * | 1/2007 | Tsuchiya et al. | 29/603.06 |
| 7,245,458 B2 | 7/2007 | Zhang et al. | |
| 7,286,325 B2 * | 10/2007 | Hernandez et al. | 360/234.5 |
| 7,301,250 B2 * | 11/2007 | Cassel | 307/106 |
| 7,331,500 B2 * | 2/2008 | Martin et al. | 228/180.21 |
| 7,344,060 B2 * | 3/2008 | Koh | 228/179.1 |
| 7,352,535 B2 * | 4/2008 | Arya et al. | 360/245.9 |
| 7,365,523 B2 * | 4/2008 | Malherbe et al. | 323/268 |
| 7,372,669 B2 | 5/2008 | Deguchi et al. | |

(Continued)

FOREIGN PATENT DOCUMENTS

| | | |
|---|---|---|
| JP | 58074272 | 5/1983 |
| JP | 02140993 | 5/1990 |
| JP | 07211368 | 8/1995 |

*Primary Examiner* — Joseph M. Pelham
*Assistant Examiner* — Jimmy Chou (57) ABSTRACT

Avoiding contaminant generation within a hard disk drive due to increased temperatures during a solder reflow process is described. Energy from a beam of energy that is directed toward a plurality of polyimide regions is received. Each of the plurality of polyimide regions are disposed adjacent to at least one solder pad. The plurality of polyimide regions and the at least one solder pad comprises a first component of a hard disk drive. Then, a portion of the energy is reflected away from the plurality of polyimide regions to prevent an absorption of the portion by the plurality of polyimide regions and a burning of the plurality of polyimide regions.

17 Claims, 5 Drawing Sheets

U.S. PATENT DOCUMENTS

| | | | | |
|---|---|---|---|---|
| 7,401,725 B2* | 7/2008 | Ho et al. | | 228/248.1 |
| 7,518,830 B1* | 4/2009 | Panchal et al. | | 360/245.8 |
| 7,535,124 B2* | 5/2009 | Miyazaki | | 307/102 |
| 7,550,876 B2* | 6/2009 | Cassel | | 307/108 |
| 7,897,055 B2* | 3/2011 | Tu et al. | | 216/13 |
| 8,072,709 B2* | 12/2011 | Rothenberg et al. | | 360/245.9 |
| 8,173,909 B2* | 5/2012 | Cayaban et al. | | 174/263 |
| 2004/0037007 A1* | 2/2004 | Rugg et al. | | 360/245.9 |
| 2006/0087011 A1* | 4/2006 | Kanagawa et al. | | 257/676 |
| 2006/0103984 A1* | 5/2006 | Shin et al. | | 360/245.9 |
| 2006/0158784 A1* | 7/2006 | Arya et al. | | 360/245.9 |
| 2008/0088978 A1* | 4/2008 | Ho et al. | | 360/264.2 |
| 2008/0099236 A1* | 5/2008 | Cayaban et al. | | 174/263 |
| 2008/0186623 A1* | 8/2008 | Cayaban et al. | | 360/97.02 |
| 2008/0253028 A1* | 10/2008 | Chang et al. | | 360/244.3 |
| 2008/0277142 A1* | 11/2008 | Kanagawa et al. | | 174/250 |
| 2009/0152954 A1* | 6/2009 | Le et al. | | 307/110 |
| 2011/0119911 A1* | 5/2011 | Kanagawa et al. | | 29/843 |

* cited by examiner

REDUCING A GENERATION OF CONTAMINANTS DURING A SOLDER REFLOW PROCESS

FIELD

Embodiments of the present technology relates generally to the field of computing.

BACKGROUND

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic TAM model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk as a string of bits.

Contamination, such as, but not limited to dust and metallic particles, located in the hard disk system may adversely affect the performance of the hard disk. For example, contamination located on the read/write head may cause unstable flight of the head. Contamination on the magnetic disk medium may contaminate the head and also cause error in information regarding the read/write on the magnetic disk.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

OVERVIEW OF DISCUSSION

Embodiments in accordance with the present technology pertain to a system for reducing contaminants generated during a solder reflow process and its usage. In one embodiment in accordance with the present technology, the system described herein enables the temperature during the soldering process to be increased so that two components of a hard disk drive may be more quickly soldered together, without the burning of a polyimide region, and thus without generating contaminants.

Generally, in the manufacture of the hard disk drive, various components of the hard disk drive may be coupled therein and therewith via the solder reflow process. For example, the flex cable and the integrated lead suspension (hereinafter, "ILS") may be soldered together. The solder pads of a flex cable and an ILS are lined up with each other and positioned such that any heating and then cooling of the respective solder pads at a threshold temperature will result in the flex cable being soldered to the ILS. A beam of energy is delivered to the solder pads in order to heat the solder pads and thus solder them together.

Adjacent to the solder pads are polyimide regions that may comprise high-temperature polyimide film, polyimide stiffeners, aluminum stiffeners, and adhesives. If the flex cable and the ILS experience a temperature that is too hot, the polyimide region itself heats up and portions thereof may become burned. These burned areas generate contaminants that ultimately reduce the performance of the hard disk drive.

Various factors within the polyimide region contribute to the absorption of energy and thus increase its internal temperature. For example, a dark-colored polyimide stiffener absorbs more energy that that of a light-colored polyimide stiffener. The absorption of this energy causes the internal temperature of a polyimide region to increase, and may result in the burning of the high-temperature polyimide film that is exposed to the beam of energy. Thus, the color of the polyimide stiffener is taken into account when determining how much energy is to be delivered to the polyimide region.

To reduce energy absorption of a polyimide stiffener, embodiments of the present technology position a copper shield pad between the polyimide region and the beam of energy directed towards the polyimide region and neighboring solder pads. Regardless of the color of the polyimide region and the amount of energy directed towards the polyimide region, this copper shield pad blocks and reflects a large portion of the energy. As such, in utilizing each of a plurality of isolated copper shield pads coupled with each of a plurality of polyimide regions, the temperature involved in the solder reflow process may be increased without regard to the darkened color of the shield pads. Thus, embodiments of the present technology provide a system that provides the ability to substantially increase the temperature during the solder reflow process without burning the polyimide region, ultimately reducing the time required for soldering components.

The discussion below will begin with an overview of a hard disk drive and components connected therewith. The discussion will then focus on embodiments of a device. Then the system and method for reducing a generation of contaminants during a solder reflow process will be discussed.

Hard Disk Drive

Figure 1:
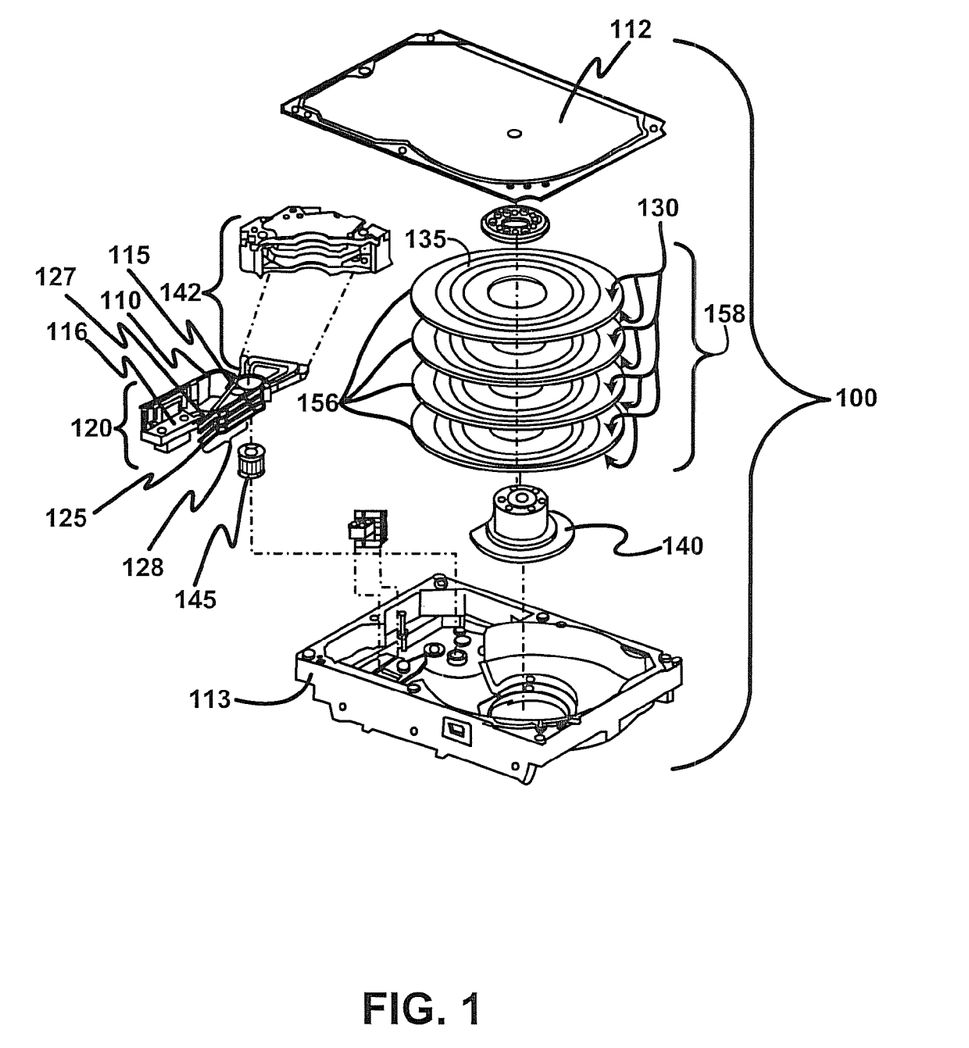
FIG. 1 is an isometric blow-apart of an HDD, in accordance with embodiments of the present technology.

With reference to FIG. 1, an isometric blow-apart of HDD 100 is shown in accordance with an embodiment of the present invention. Base casting 113 provides coupling points for components and subassemblies such as disk stack 158, voice coil motor (VCM) 142, and HSA 120. Disk stack 158 is coupled with base casting 113 by means of motor-hub assembly 140. Motor-hub assembly 140 will have at least one disk 156 coupled with it such that disk 156 can rotate about an axis common to motor-hub assembly 140 and the center of disk 156. Disk 156 has at least one disk surface 130 upon which reside data track 135. HSA 120, referred to as an actuator when coupled with pivot bearing 145, comprises suspension 127, which suspends hard disk drive slider 125 next to disk surface 130, and connector 116, which conveys data between A/E module 115 and a host system wherein HDD 100 resides. Suspension 127 and hard disk drive slider 125 comprise head gimbal assembly (HGA) 128. Flex cable 110, which is part of HSA 120, conveys data between connector 116 and HSA 120.

HSA 120 is coupled pivotally with base casting 113 by means of pivot bearing 145, such that VCM 142 can move HGA 128 with slider 125 arcuately across disk surface 130. Upon assembly of HSA 120, disk stack 158, VCM 142, and other components with base casting 113, cover 112 is coupled with base casting 113 to enclose these components and subassemblies into HDD 100.

Example System

Figure 2:
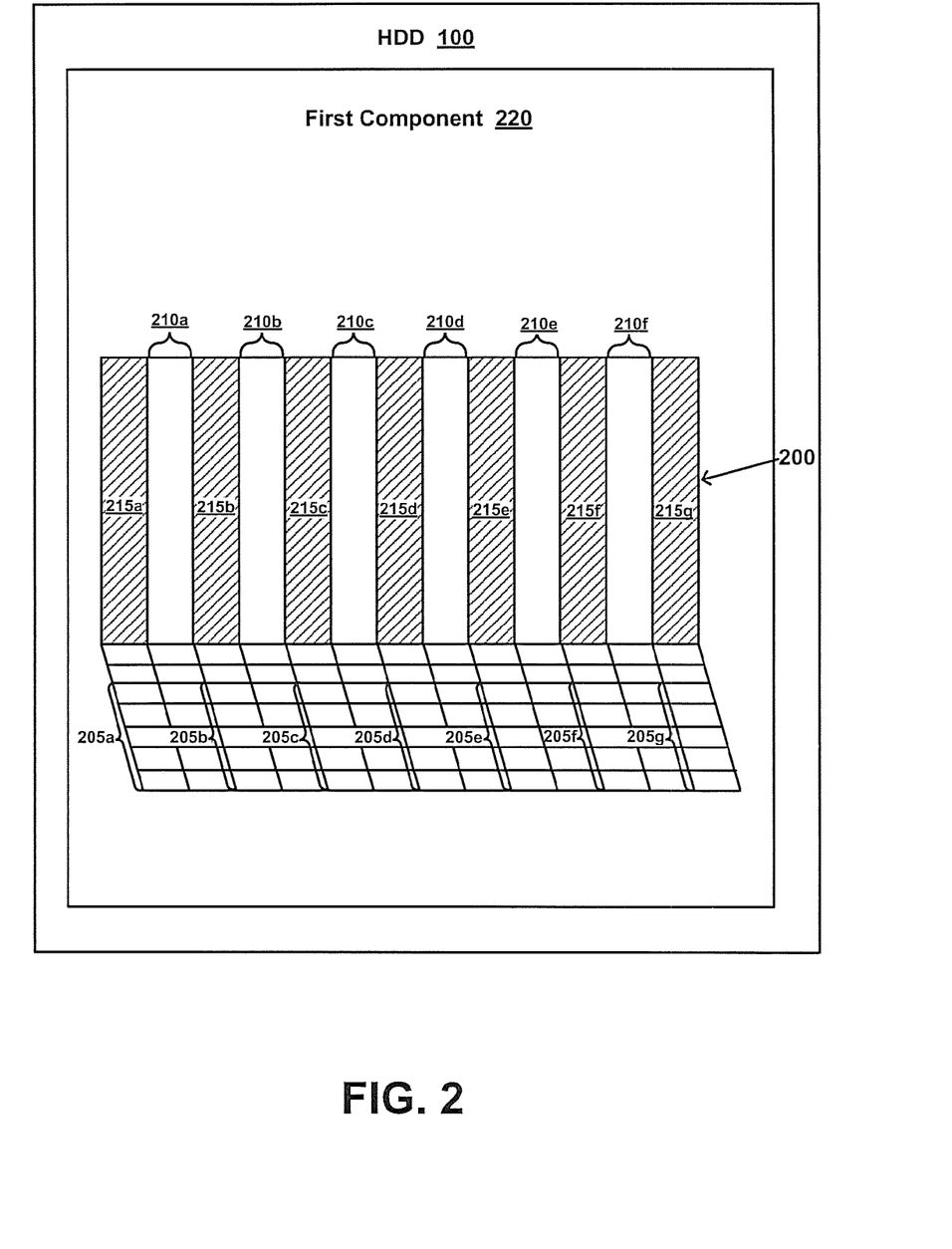
FIG. 2 is a block diagram of an example system for reducing a generation of contaminants during a solder reflow process, in accordance with embodiments of the present technology.

FIG. 2 is a block diagram of an example system 200 for reducing a generation of contaminants during a solder reflow process, in accordance with one embodiment of the present technology. Device 200 includes a plurality of polyimide regions 205a-205g, at least one solder pad 210a-210f, and a plurality of isolated copper shield pads 215a-215g.

In one embodiment, each of plurality of polyimide regions 205a-205g is disposed adjacent to at least one solder pad 210a-210f. Plurality of polyimide regions 205a-205g and at least one solder pad 210a-210f comprise first component 220 of hard disk drive 100. In one embodiment, first component 220 is a flex cable. In another embodiment, first component 220 is coupled with a second component of HDD 100, wherein the second component is an ILS.

Each of plurality of isolated copper shield pads 215a-215g is coupled with each of plurality of polyimide regions 205a-205g. Additionally, each of plurality of isolated copper shield pads 215a-215g is not shorted with any other circuit.

Figure 3:
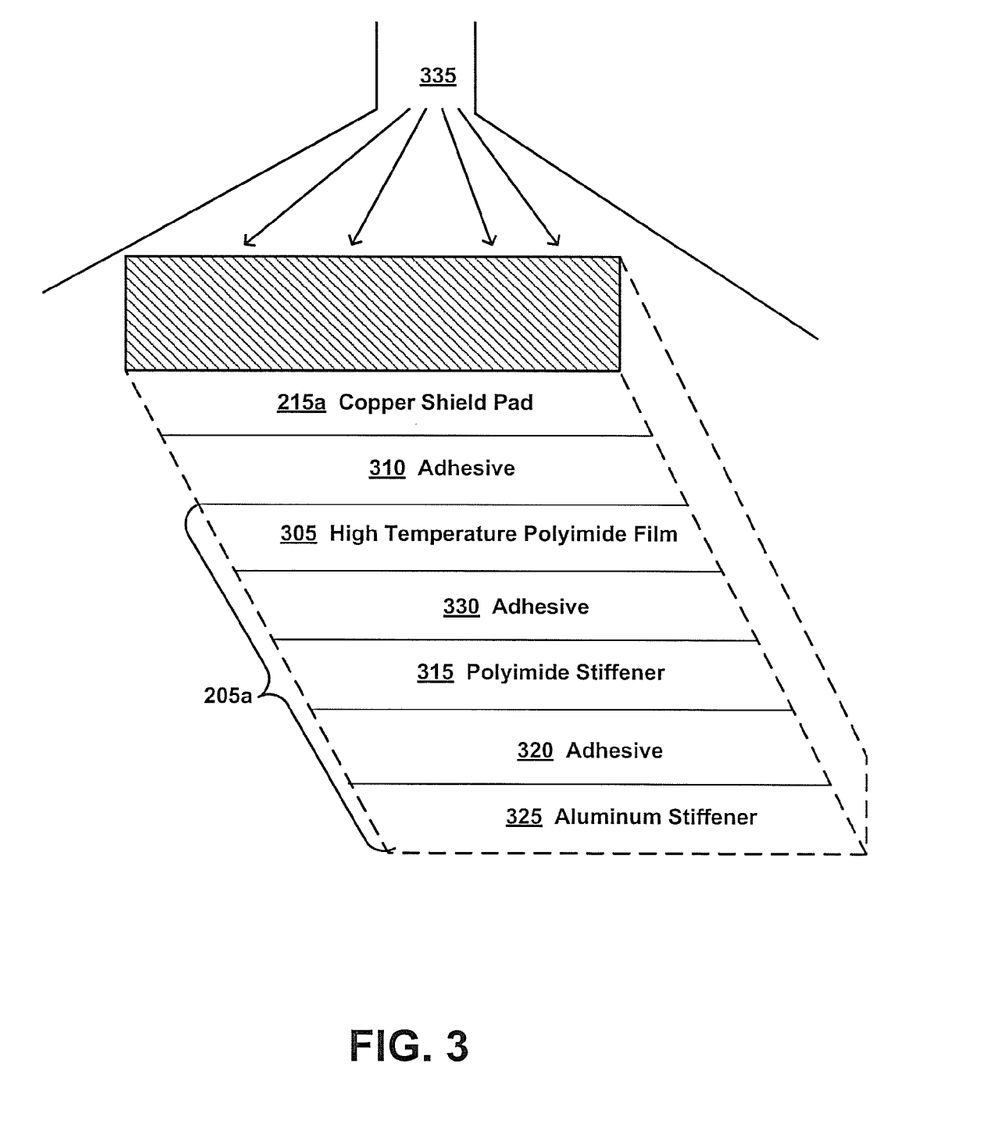
FIG. 3 is a block diagram of an exploded view of an example one of a plurality of polyimide regions shown in FIG. 2 with a copper shield pad coupled therewith, in accordance with embodiments of the present technology.

Referring now to FIG. 3, a block diagram of an exploded view of an example one 205a of plurality of polyimide regions 205a-205g shown in FIG. 2 with a copper shield pad 215a coupled therewith, in accordance with embodiments of the present technology. Copper shield pad 215a blocks incoming light and absorbs some energy. However, much more energy is reflected than is absorbed.

In one embodiment, plurality of polyimide regions 205a-205g comprises a first adhesive 320 coupled with an aluminum stiffener 325. A polyimide stiffener 315 is coupled with first adhesive 320. A second adhesive 330 is coupled with polyimide stiffener 315. A high-temperature polyimide film 305 is coupled with second adhesive 330.

In another embodiment, each of plurality of isolated copper shield pads 215a-215g is coupled with a high-temperature polyimide film such as 305. In one embodiment, each of plurality of isolated copper shield pads 215a-215g is coupled with the high-temperature polyimide film sold under the trademark KAPTON. High-temperature polyimide film is capable of remaining stable in a wide range of temperatures. In another embodiment, each of plurality of isolated copper shield pads 215a-215g is coupled with high-temperature polyimide film 305 via adhesive 310. Adhesive 310 may be any adhesive that is suitable for functioning to couple an isolated copper shield pad and a high-temperature polyimide film therewith as intended and suitable for use with HDD 100.

In another embodiment, each of plurality of polyimide regions 205a-205g comprises polyimide stiffener 315. Polyimide stiffener 315 may be any poly imide stiffener known in the art and capable for use within said HDD 100 and as intended. Polyimide stiffener 315 is the source of color that affects absorption of energy from energy beam 335. For example, polyimide stiffener 315 may be of a dark color or it may be translucent.

In yet another embodiment, each of plurality of isolated copper shield pads 215a-215g is a layer of copper directly exposed to beam of energy 335. For example and referring to FIG. 3, the first material of system 200 that beam of energy 335 contacts is copper shield pad 215a.

Thus, embodiments of the present technology have at least two functions. Embodiments provide a copper shield pad that blocks light and reduces the absorption of energy by material comprising the polyimide region, thereby reducing the risk of contaminants being generated via a solder reflow process. Additionally, a copper shield pad coupled with a polyimide region also enables temperatures to be increased while soldering, thus enabling quicker soldering.

Figure 4:
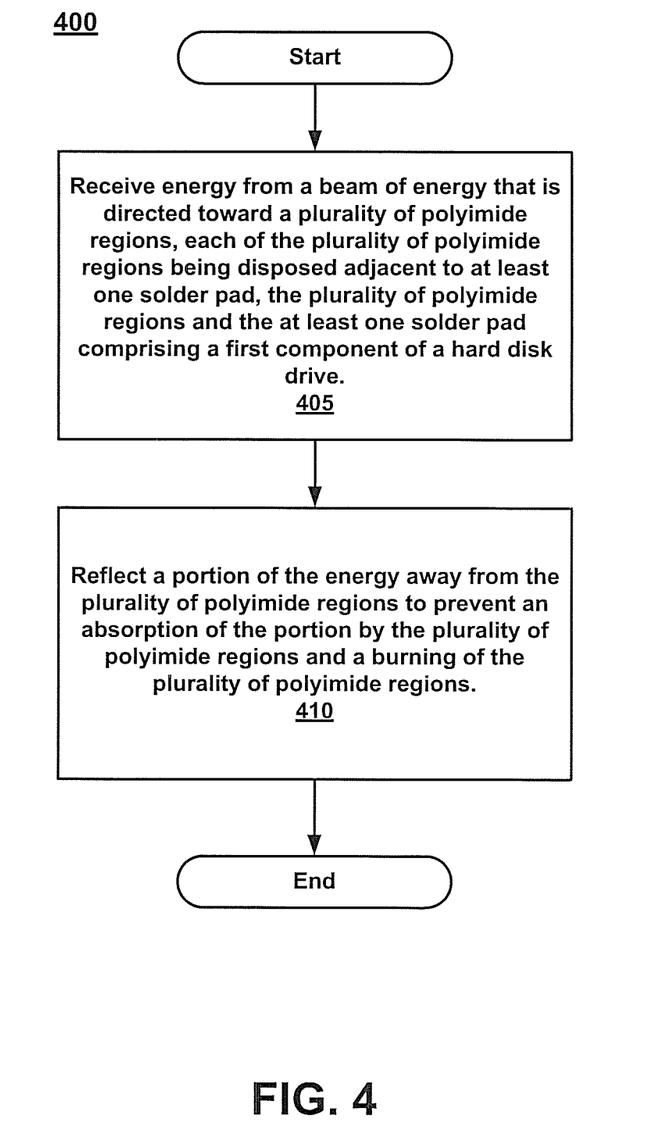
FIG. 4 illustrates a flow chart of an example method of avoiding contaminant generation within a hard disk drive due to increased temperatures during a solder reflow process, in accordance with embodiments of the present technology.

Example Method of Avoiding Contaminant Generation within a Hard Disk Drive while Enabling Temperatures to be Increased During a Solder Reflow Process FIG. 4 illustrates a flow chart of an example method of avoiding contaminant generation within a hard disk drive while enabling temperatures to be increased during a solder reflow process, in accordance with embodiments of the present technology.

Referring to 405 of FIG. 4 and as described herein, in one embodiment energy from beam of energy 335 that is directed toward plurality of polyimide regions 205a-205g is received. Each of plurality of polyimide regions 205a-205g and at least one solder pad 210a-210f comprise first component 220 of hard disk drive 100. In one embodiment, a flex cable is utilized as first component 220. In another embodiment, an ILS is utilized as a second component of hard disk drive 100 coupled with first component 220.

In one embodiment, high-temperature polyimide film 305 is utilized as each of plurality of isolated copper shield pads 215a-215g. In another embodiment, polyimide stiffener 315 is utilized as part of each of the plurality of polyimide regions 205a-205g.

In yet another embodiment, a first adhesive 320 coupled with aluminum stiffener 325, a polyimide stiffener 315 coupled with first adhesive 320, second adhesive 330 coupled with polyimide stiffener 315, and a high-temperature polyimide film 305 coupled with second adhesive 330 is utilized as each of plurality of polyimide regions 205a-205g.

Referring to 410 of FIG. 4 and as described herein, in one embodiment a portion of the energy is reflected away from plurality of polyimide regions 205a-205g to prevent an absorption of the portion by plurality of polyimide regions 205a-205g and a burning of plurality of polyimide regions 205a-205g.

Figure 5:
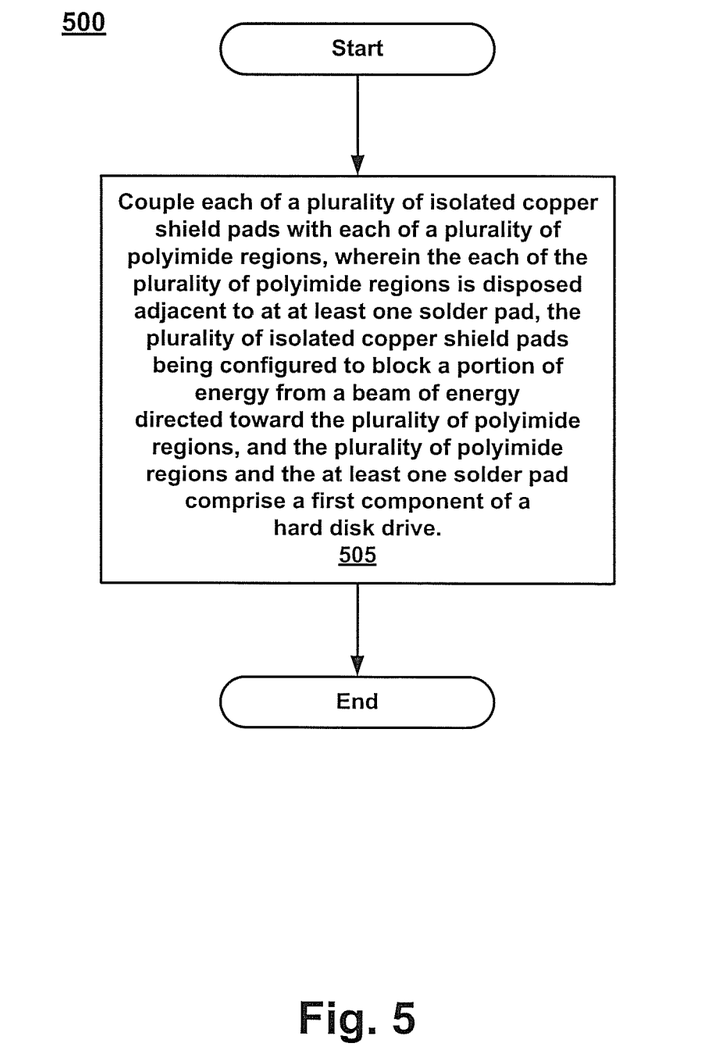
FIG. 5 illustrates a flow chart of an example method of manufacturing a device for avoiding contaminant generation within a hard disk drive due to increased temperatures during a solder reflow process, in accordance with embodiments of the present technology.

FIG. 5 illustrates a flow chart of an example method of manufacturing a device for avoiding contaminant generation within a hard disk drive due to increased temperatures during a solder reflow process, in accordance with embodiments of the present technology.

Referring now to 505 of FIG. 5 and as described herein, in one embodiment, each of a plurality of isolated copper shield pads 215a-215g is coupled with each of a plurality of polyimide regions 205a-205g, wherein each of the plurality of polyimide regions 205a-205g is disposed adjacent to at least one solder pad 210a-210f, said plurality of isolated copper shield pads 215a-215g is configured to block a portion of energy from beam of energy 335 that is directed toward said plurality of polyimide regions 205a-205g, and the plurality of polyimide regions 205a-205g and the at least one solder pad 210a-210f comprise first component 220 of a hard disk drive 100.

Thus, embodiments of the present technology enable dark-colored polyimide stiffeners to be utilized without sustaining contamination generation. Additionally, embodiments of the present technology enable a quicker soldering rate by increasing the energy of a soldering beam, without sustaining contamination generation.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for reducing a generation of contaminants during a solder reflow process, said system comprising:
a plurality of polyimide regions, each of said plurality of polyimide regions disposed adjacent to at least one solder pad, said plurality of polyimide regions and said at least one solder pad comprising a first component of a hard disk drive, wherein said each of said plurality of polyimide regions comprises a first adhesive coupled with an aluminum stiffener, a polyimide stiffener coupled with said first adhesive, a second adhesive coupled with said polyimide stiffener, and a high-temperature polyimide film coupled with said second adhesive; and
a plurality of isolated copper shield pads coupled with said high-temperature polyimide film, each of said plurality of isolated copper shield pads being coupled with said each of said plurality of polyimide regions and configured to block a portion of energy from a beam of energy directed towards said plurality of polyimide regions.

2. The system of claim 1, wherein said first component is a flex cable.

3. The system of claim 1, wherein said first component is configured to be coupled with a second component of said hard disk drive, said second component being an integrated lead suspension.

4. The system of claim 1, wherein said each of said plurality of isolated copper shield pads is coupled with a high-temperature polyimide film.

5. The system of claim 4, wherein said each of said plurality of isolated copper shield pads is coupled with said high-temperature polyimide film via an adhesive.

6. The system of claim 1, wherein said each of said plurality of polyimide regions comprises a polyimide stiffener.

7. The system of claim 1, wherein said each of said plurality of isolated copper shield pads is a layer of copper configured to block said portion of energy from said beam of energy when said layer of copper is directly exposed to said portion of energy.

8. A method of avoiding contaminant generation within a hard disk drive due to increased temperatures during a solder reflow process, said method comprising:
receiving energy from a beam of energy that is directed toward a plurality of polyimide regions, each of said plurality of polyimide regions being disposed adjacent to at least one solder pad, said plurality of polyimide regions and said at least one solder pad comprising a first component of a hard disk drive;
utilizing at each of said plurality of polyimide regions a first adhesive coupled with an aluminum stiffener, a polyimide stiffener coupled with said first adhesive, a second adhesive coupled with said polyimide stiffener, a high-temperature polyimide film coupled with said second adhesive, and said high-temperature polyimide film coupled with a plurality of isolated copper shield pads, each of said plurality of isolated copper shield pads being coupled with said each of said plurality of polyimide regions and configured to block a portion of energy from a beam of energy directed towards said plurality of polyimide regions; and
reflecting said portion of said energy away from said plurality of polyimide regions to prevent absorption of said portion by said plurality of polyimide regions and a burning of said plurality of polyimide regions.

9. The method of claim 8, further comprising:
utilizing a flex cable as said first component.

10. The method of claim 8, further comprising:
utilizing an integrated lead suspension as a second component of said hard disk drive coupled with said first component.

11. The method of claim 8, further comprising:
utilizing a high-temperature polyimide film as each of a plurality of isolated copper shield pads.

12. The method of claim 8, further comprising:
utilizing a polyimide stiffener as part of said each of said plurality of polyimide regions.

13. A method of manufacturing a device for avoiding contaminant generation within a hard disk drive due to increased temperatures during a solder reflow process, said method comprising:
coupling each of a plurality of isolated copper shield pads with each of a plurality of polyimide regions, wherein said each of said plurality of polyimide regions is disposed adjacent to at least one solder pad, said plurality of isolated copper shield pads being configured to block a portion of energy from a beam of energy directed toward said plurality of polyimide regions, and said plurality of polyimide regions and said at least one solder pad comprise a first component of a hard disk drive; and utilizing at each of said plurality of polyimide regions a first adhesive coupled with an aluminum stiffener, a polyimide stiffener coupled with said first adhesive, a second adhesive coupled with said polyimide stiffener, and a high-temperature polyimide film coupled with said second adhesive on a first side of said high-temperature polyimide film and said high-temperature polyimide coupled with said plurality of isolated copper shield pads on a second side of said high-temperature polyimide film.

14. The method of claim 13, further comprising:
utilizing a flex cable as said first component.

15. The method of claim 13, further comprising:
utilizing an integrated lead suspension as a second component of said hard disk drive coupled with said first component.

16. The method of claim 13, further comprising:
utilizing a high-temperature polyimide film as said each of said plurality of isolated copper shield pads.

17. The method of claim 13, further comprising:
utilizing a polyimide stiffener as part of said each of said plurality of polyimide regions.

\* \* \* \* \*